US012032377B2

(12) United States Patent
Guo et al.

(10) Patent No.: US 12,032,377 B2
(45) Date of Patent: Jul. 9, 2024

(54) MOBILITY AID ROBOT NAVIGATING METHOD AND MOBILITY AID ROBOT USING THE SAME

(71) Applicant: UBKang (Qingdao) Technology Co., Ltd., Qingdao (CN)

(72) Inventors: Dejun Guo, San Gabriel, CA (US); Aravind Sreejith, Davis, CA (US); Chuqiao Dong, Pasadena, CA (US); Dan Shao, San Gabriel, CA (US); Zhen Xiu, Chino Hills, CA (US); Huan Tan, Pasadena, CA (US)

(73) Assignee: UBKANG (QINGDAO) TECHNOLOGY CO., LTD., Qingdao (CN)

( * ) Notice: Subject to any disclaimer, the term of this patent is extended or adjusted under 35 U.S.C. 154(b) by 354 days.

(21) Appl. No.: 17/329,197

(22) Filed: May 25, 2021

(65) Prior Publication Data

US 2022/0382282 A1    Dec. 1, 2022

(51) Int. Cl.
*A61H 3/04* (2006.01)
*G05D 1/00* (2024.01)
(Continued)

(52) U.S. Cl.
CPC .............. *G05D 1/0212* (2013.01); *A61H 3/04* (2013.01); *G05D 1/0246* (2013.01); *G06T 7/251* (2017.01);
(Continued)

(58) Field of Classification Search
CPC .............. G05D 1/0212; G05D 1/0246; G05D 2201/0206; G05D 1/0094; G06T 7/251;
(Continued)

(56) References Cited

U.S. PATENT DOCUMENTS 9,530,299 B2 *  12/2016  Dayal ................. G09B 21/003
11,175,147 B1 *  11/2021  Olmstead ............... H04W 4/40
(Continued)

FOREIGN PATENT DOCUMENTS

CN       105629971 A    6/2016
CN       105769482 A    7/2016
(Continued)

OTHER PUBLICATIONS

ISR for PCT/CN2022/073209.
Written opinions of ISA for PCT/CN2022/073209.

*Primary Examiner* — Marc Burgess
*Assistant Examiner* — Merritt E Levy

(57) ABSTRACT

Navigation of a mobility aid robot having a camera and gripping part(s) disposed toward different directions is disclosed. The mobility aid robot is navigated to approach a user by identifying a posture of the user through the camera, determining a mode of the robot according to a type of the specified task to be performed on the user and the identified posture of the user, controlling the robot to move according to a planned trajectory corresponding to the determined mode of the robot, and turning the robot upon reaching the desired pose such that the gripping part faces the user, in response to the determined mode of the robot corresponding to the specified task of an assisting type and the user at one of a standing posture and a sitting posture.

18 Claims, 13 Drawing Sheets

(51) Int. Cl.
*G06T 7/246* (2017.01)
*G06V 20/58* (2022.01)
*G06V 40/10* (2022.01)

(52) U.S. Cl.
CPC ............ *G06V 20/58* (2022.01); *G06V 40/103* (2022.01); *A61H 2003/043* (2013.01)

(58) Field of Classification Search
CPC ...... G06V 20/58; G06V 40/103; G06V 10/44; A61H 3/04; A61H 2003/043; A61H 2003/046; A61H 2201/1635; A61H 2201/1659; A61H 2201/501; A61H 2201/5092; A61H 2230/625
USPC .......................................................... 701/25
See application file for complete search history.

(56) References Cited

U.S. PATENT DOCUMENTS

| | | | | |
|---|---|---|---|---|
| 2009/0055019 | A1* | 2/2009 | Stiehl | B25J 9/1671 901/17 |
| 2012/0185094 | A1* | 7/2012 | Rosenstein | H04N 13/271 901/1 |
| 2013/0144440 | A1* | 6/2013 | Shimizu | B25J 11/0005 700/262 |
| 2013/0261867 | A1* | 10/2013 | Burnett | G05D 1/0225 359/350 |
| 2014/0277735 | A1* | 9/2014 | Breazeal | B25J 9/0003 700/259 |
| 2015/0359691 | A1* | 12/2015 | Isozumi | A61H 3/04 180/19.1 |
| 2018/0133899 | A1* | 5/2018 | Shimizu | G05D 1/0274 |
| 2018/0143634 | A1* | 5/2018 | Ott | G05D 1/0221 |
| 2018/0239355 | A1* | 8/2018 | Lee | G08G 1/166 |
| 2019/0142684 | A1* | 5/2019 | Liang | A61H 1/00 135/66 |
| 2019/0243373 | A1* | 8/2019 | Kuo | H02J 7/0042 |
| 2019/0313915 | A1* | 10/2019 | Tzvieli | G01J 5/12 |
| 2019/0365592 | A1* | 12/2019 | Norton | A61H 3/04 |
| 2021/0041878 | A1* | 2/2021 | Seifert | G05D 1/0016 |
| 2021/0166039 | A1* | 6/2021 | Lin | G06V 10/82 |
| 2022/0083769 | A1* | 3/2022 | Nakayama | G06T 7/73 |
| 2023/0057965 | A1* | 2/2023 | Peng | A47L 9/00 |

FOREIGN PATENT DOCUMENTS

| | | | | |
|---|---|---|---|---|
| CN | 107315414 A | * | 11/2017 | .......... G05D 1/0238 |
| WO | WO-2019014277 A1 | * | 1/2019 | ............ A45C 15/00 |
| WO | WO-2020230734 A1 | * | 11/2020 | |

* cited by examiner

MOBILITY AID ROBOT NAVIGATING METHOD AND MOBILITY AID ROBOT USING THE SAME

BACKGROUND

1. Technical Field

The present disclosure relates to navigations, and particularly to a mobility aid robot navigating method and a mobility aid robot using the same.

2. Description of Related Art

Mobility aids are devices designed to assist walking or otherwise so as to improve the mobility of people with a mobility impairment. Common walking aids such as walking sticks, wheelchairs, and walkers help a user with impaired ability to walk by providing supports and mobile functions.

With the getting popular use of the mobile robots (e.g., sweeper robots and self-driving cars) that are realized with the help of artificial intelligence (AI) techniques in various scenes of daily life to provide various services such as housework, transportation, and healthcare, mobility aid robots that have the functions like walking aids and further have automatic navigation capability to assist the user in a more automatic and convenient way are also developed.

The researches and functions of the existing mobility aid robots mainly focus on navigation functions including trajectory planning and motion controls to solve navigation-side parking problems while the body detection and its integration with navigation functions are ignored, and therefore not capable of providing the navigation functions adaptive to different postures of the user.

BRIEF DESCRIPTION OF THE DRAWINGS

In order to more clearly illustrate the technical solutions in this embodiment, the drawings used in the embodiments or the description of the prior art will be briefly introduced below. In the drawing(s), like reference numerals designate corresponding parts throughout the figures. It should be understood that, the drawings in the following description are only examples of the present disclosure. For those skilled in the art, other drawings can be obtained based on these drawings without creative works.

DETAILED DESCRIPTION

Figure 1A:
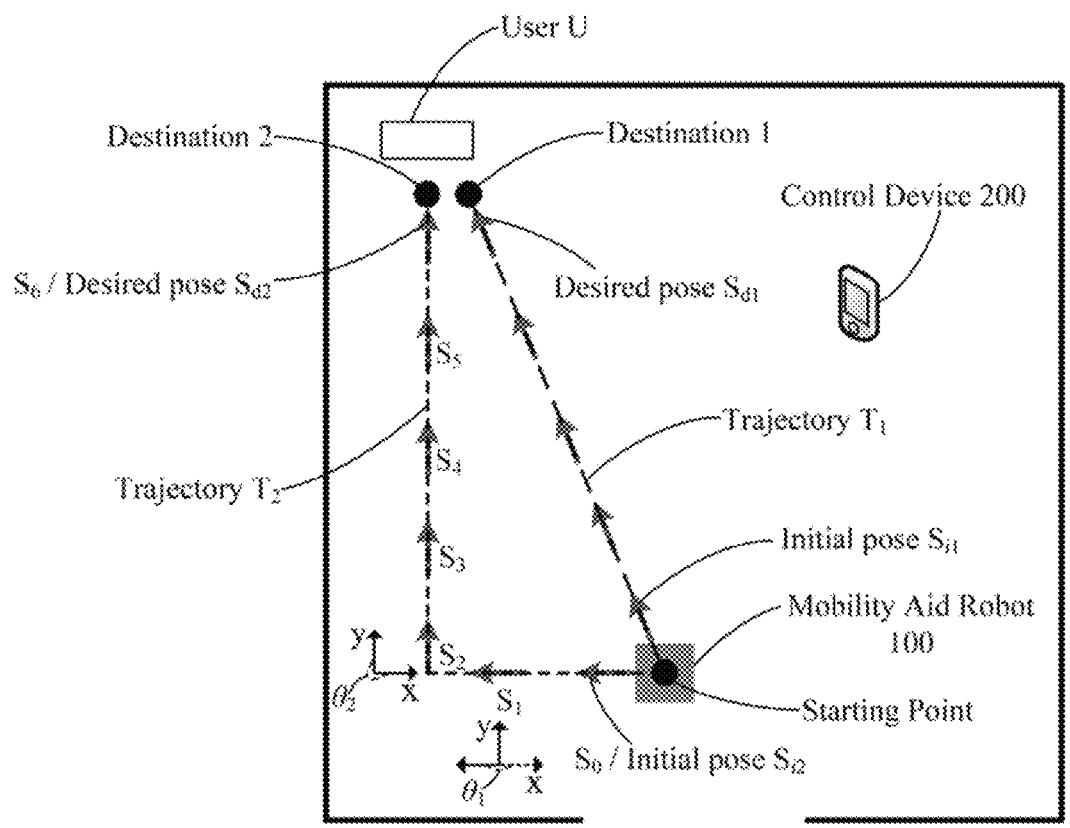
FIG. 1A is a schematic diagram of a scenario of navigating a mobility aid robot according to some embodiments of the present disclosure.

In order to make the objects, features and advantages of the present disclosure more obvious and easy to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including", "comprising", "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

In the present disclosure, the terms "first", "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present disclosure, the meaning of "a plurality" is at least two, for example, two, three, and the like, unless specifically defined otherwise.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in other embodiments", "in other embodiments" and the like that appear in different places of the specification do not mean that descripted embodiments should be referred by all other embodiments, but instead be referred by "one or more but not all other embodiments" unless otherwise specifically emphasized.

The present disclosure relates to mobility aid robot navigating. As used herein, the term "mobility aid robot" refers to a mobile robot that has the capability to aid its user in walking, which may have structure like, for example, a walker or a wheelchair. The term "trajectory planning" refers to find a sequence of valid configurations that moves a robot from the source to the destination and is parametrized by time, where "trajectory" denotes a sequence of poses with time stamp (cf. "path" denotes a sequence of poses or position without time stamp). The term "pose" refers to position (e.g., x and y coordinates on x and y axes) and posture (e.g., a yaw angle along z axis). The term "navigation" refers to the process of monitoring and controlling the movement of a mobile robot from one place to another, and the term "collision avoidance" refers to prevent or reduce the severity of a collision. The term "sensor" refers to a device, module, machine, or subsystem such as ambient light sensor and image sensor (e.g., camera) whose purpose is to detect events or changes in its environment and send the information to other electronics (e.g., processor).

FIG. 1A is a schematic diagram of a scenario of navigating a mobility aid robot 100 according to some embodiments of the present disclosure. The mobility aid robot 100 is navigated in its environment (e.g., a living room) to, for example, performing an assisting task such as walking aid (walking assist), parking for pick up, and parking for interaction on a user U, while dangerous situations such as collisions and unsafe conditions (e.g., falling, extreme temperature, radiation, and exposure) may be prevented. In this indoor navigation, the mobility aid robot 100 is navigated from a starting point (e.g., the location where the mobility aid robot 100 originally locates) to a destination (e.g., the location of the goal of navigation which is indicated by the user U or the navigation/operation system of the mobility aid robot 100), while obstacles (e.g., walls, furniture, humans, pets, and garbage) may be avoided so as to prevent the above-mentioned dangerous situations. The trajectory(s) (e.g., trajectory $T_1$ and trajectory $T_2$) for the mobility aid robot 100 to move from the starting point to the destination (e.g., destination 1 and destination 2) has to be planned so as to move the mobility aid robot 100 according to the trajectory(s). Each trajectory includes a sequence of poses (e.g., poses $S_0$-$S_6$ of trajectory $T_2$). It should be noted that, the starting point and the destination only represent the locations of the mobility aid robot 100 in the scenario shown in the figure, rather than the real beginning and end of the trajectory(s) (the real beginning and end of a trajectory should be a pose, respectively, e.g., initial poses $S_{i1}$, $S_{i2}$ and desired poses $S_{d1}$, $S_{d2}$ in FIG. 1A). In some embodiments, for realizing the navigation of the mobility aid robot 100, the map for the environment has to be built, the position of the mobility aid robot 100 in the environment may have to be determined, and trajectories may be planned based on the built map and the determined position of the mobility aid robot 100.

Figure 1B:
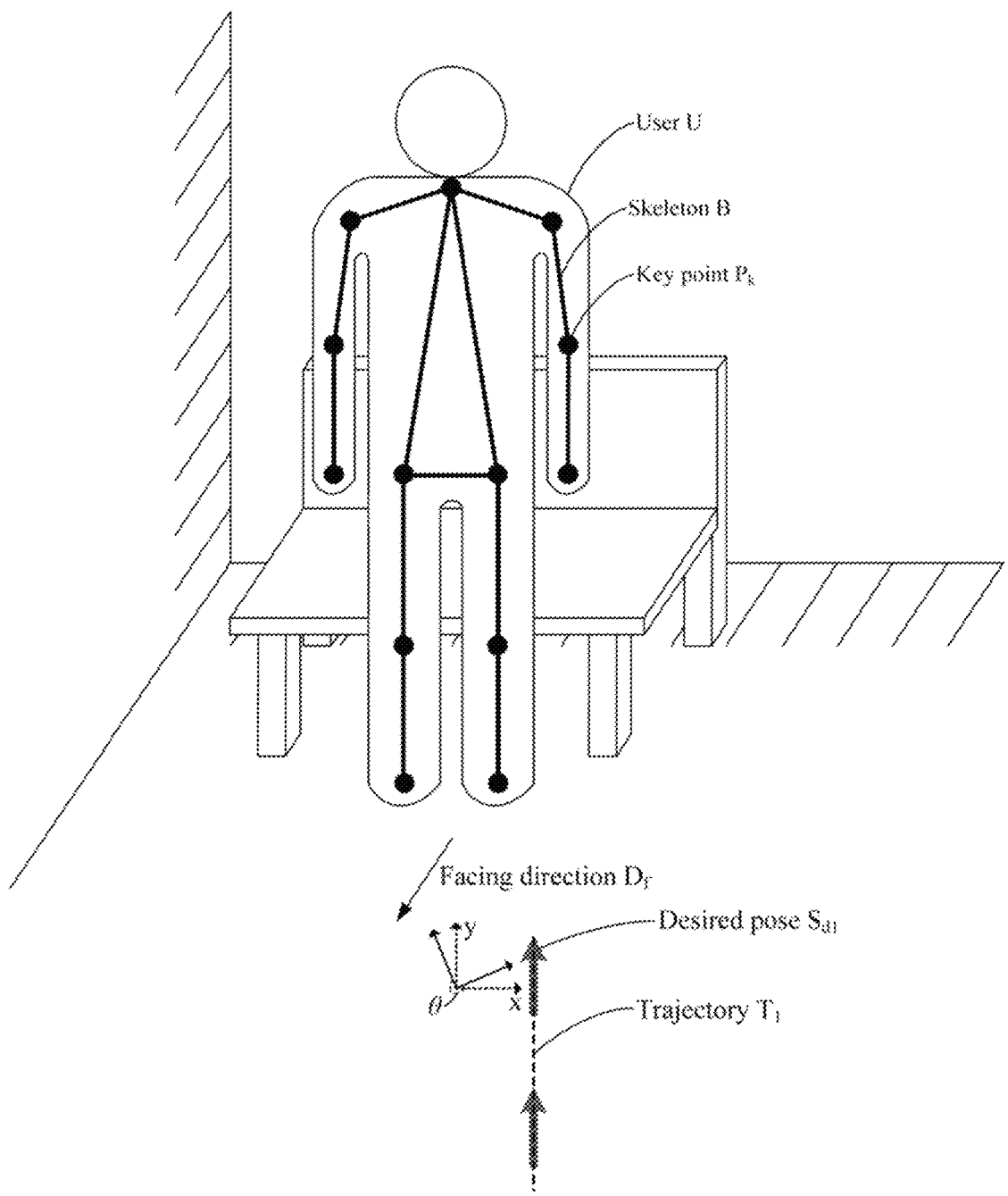
FIG. 1B is a schematic diagram of navigating a mobility aid robot to a first desired pose in the scenario of FIG. 1A.
Figure 1C:
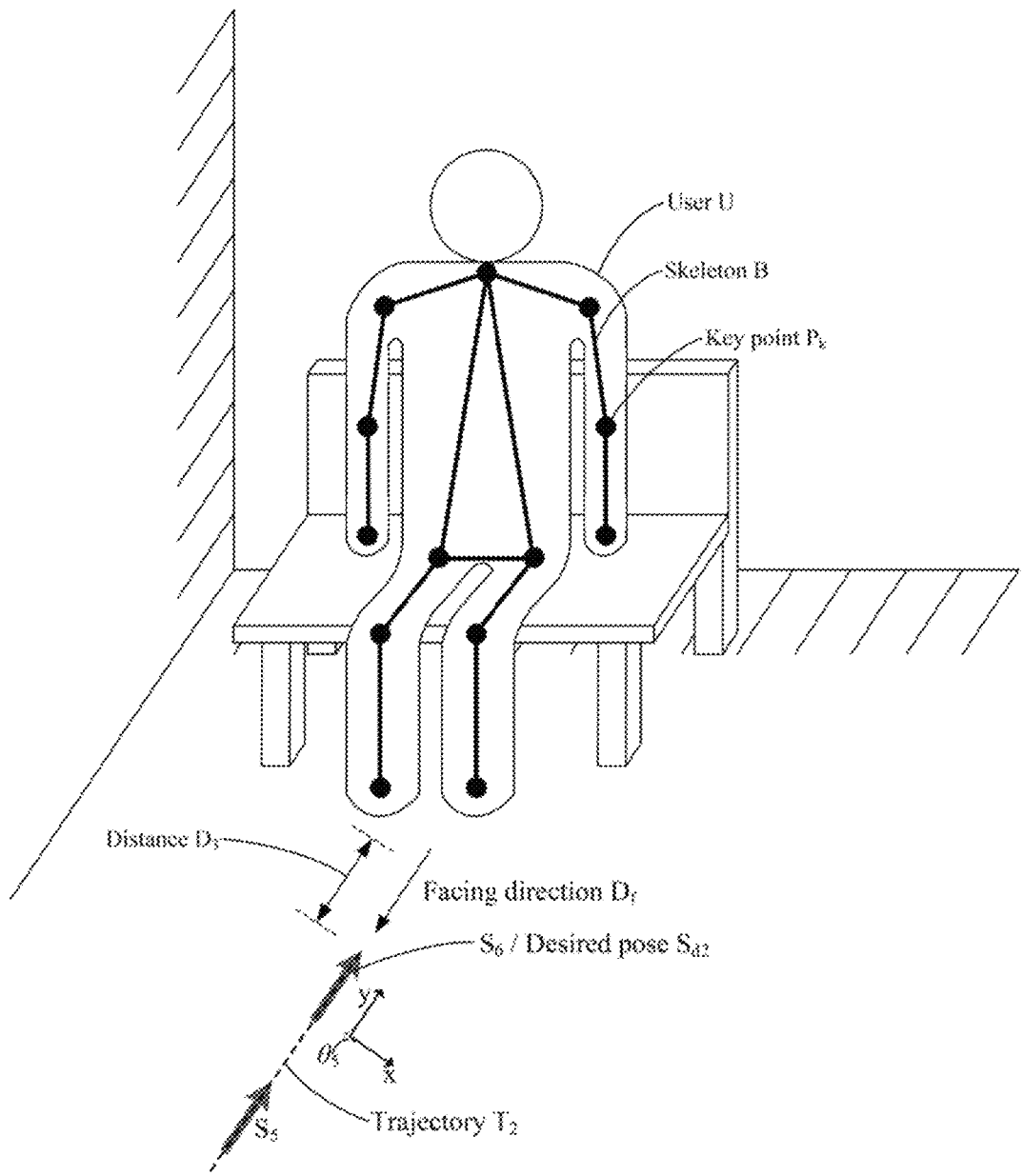
FIG. 1C is a schematic diagram of navigating a mobility aid robot to a second desired pose in the scenario of FIG. 1A.

First initial pose $S_{i1}$ is the beginning of a trajectory $T_1$, and second initial pose $S_{i2}$ is the beginning of a trajectory $T_2$. FIG. 1B is a schematic diagram of navigating the mobility aid robot 100 to a first desired pose $S_{d1}$ in the scenario of FIG. 1A; and FIG. 1C is a schematic diagram of navigating the mobility aid robot 100 to a second desired pose $S_{d2}$ in the scenario of FIG. 1A. The first desired pose $S_{d1}$ is the last of the sequence of poses S in the trajectory $T_1$, that is, the end of the trajectory $T_1$. The second desired pose $S_{d2}$ is the last of the sequence of poses S in the trajectory $T_2$, that is, the end of the trajectory $T_2$. The trajectory $T_1$ is planned according to, for example, a shortest path in the built map to the user U. The trajectory $T_2$ is planned corresponding to, for example, a facing direction $D_f$ of the user U. In addition, the collision avoidance to obstacles in the built map (e.g., walls and furniture) or that detected in real time (e.g., humans and pets) may also be considered when planning, so as to accurately and safely navigate the mobility aid robot 100.

In some embodiments, the navigation of the mobility aid robot 100 may be actuated through the mobility aid robot 100 itself (e.g., a control interface on the mobility aid robot 100) or a control device 200 such as a remote control, a smart phone, a tablet computer, a notebook computer, a desktop computer, or other electronic device by, for example, providing a request for the assistance of the mobility aid robot 100. The mobility aid robot 100 and the control device 200 may communicate over a network which may include, for example, the Internet, intranet, extranet, local area network (LAN), wide area network (WAN), wired network, wireless networks (e.g., Wi-Fi network, Bluetooth network, and mobile network), or other suitable networks, or any combination of two or more such networks.

Figure 2A:
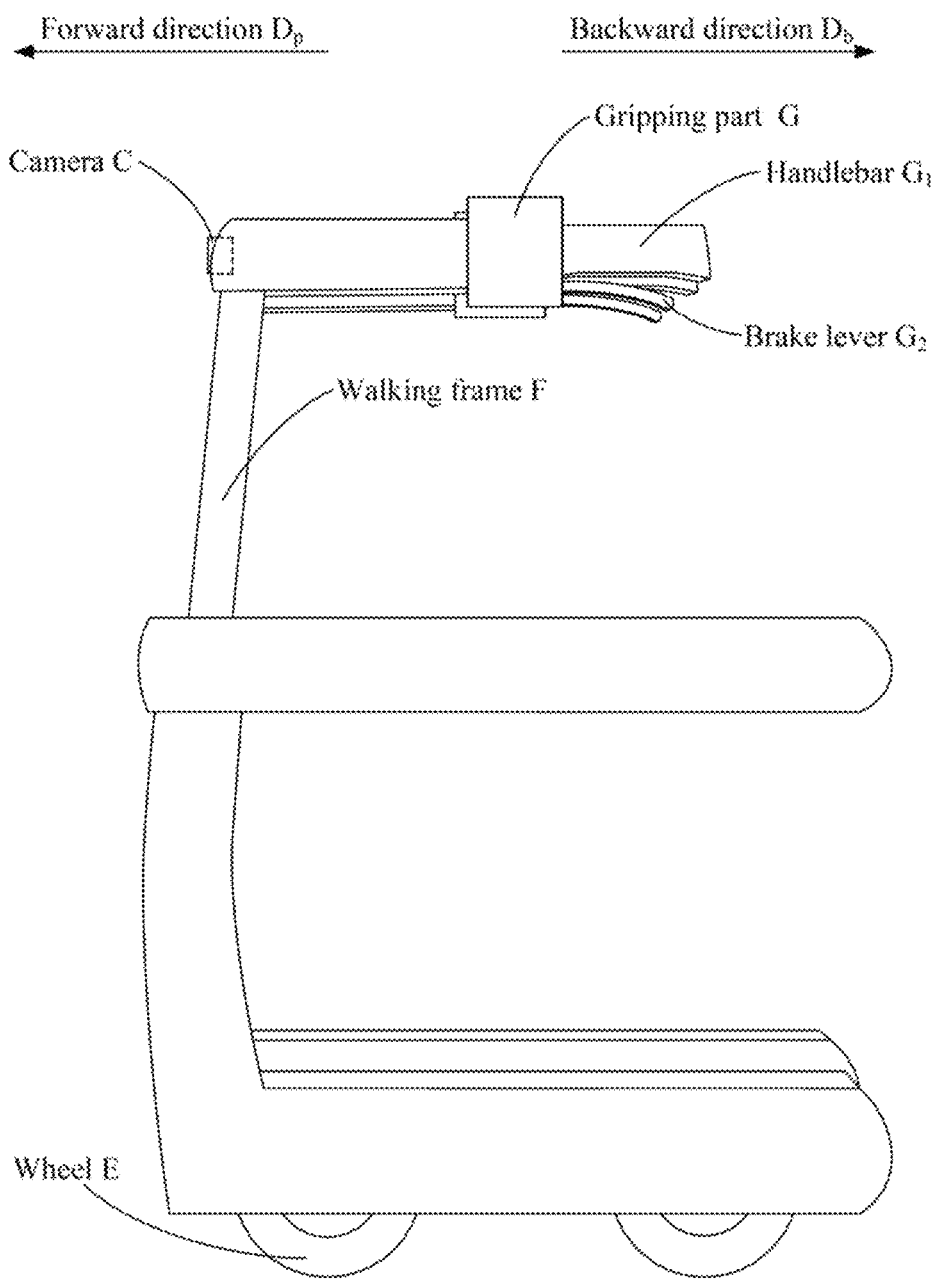
FIG. 2A is a perspective view of a mobility aid robot according to some embodiments of the present disclosure.

FIG. 2A is a perspective view of the mobility aid robot 100 according to some embodiments of the present disclosure. In some embodiments, the mobility aid robot 100 may be a mobile robot such as a wheeled robot, which may include a walking frame F, gripping parts G, wheels E, and a camera C, and therefore have a structure like a walker. It should be noted that, the mobility aid robot 100 is only one example of mobility aid robot, and the mobility aid robot 100 may have more or fewer parts than shown in above or below (e.g., have legs rather than the wheels E), or may have a different configuration or arrangement of the parts (e.g., have a single gripping part such as a grip bar). The gripping parts G are attached to an upper edge of the walking frame F for the user U to grip, and the wheels E are attached to a bottom (e.g., a chassis) of the walking frame F for moving the walking frame F, so that the user U can be supported by the mobility aid robot 100 to stand and move with the assistance of the mobility aid robot 100. The height of the walking frame F may be manually or automatically adjusted by, for example, telescoping mechanisms in the walking frame F such as telescopic rods so that the gripping parts G meet a height convenient for the user U to grip. The gripping parts G may include a pair of handlebars $G_1$ disposed in parallel for the user U to grip through two hands and brake levers $G_2$ mounted on the handlebars $G_1$ for the user U to brake the mobility aid robot 100 through the two hands, and may also include related parts such as Bowden cables. The camera C and the gripping parts G are disposed toward different directions. In the mobility aid robot 100, the camera C is disposed toward a forward direction $D_p$ which the mobility aid robot 100 straightly moves such that, for example, lens of the camera C straightly face toward the forward direction $D_p$, and the gripping parts G are disposed toward a backward direction $D_b$ that is basically counter to the forward direction $D_p$ such that, for example, the handlebars $G_1$ extend toward the backward direction $D_b$. In other embodiments, the mobility aid robot 100 may be another kind of mobile machine such as a vehicle.

Figure 2B:
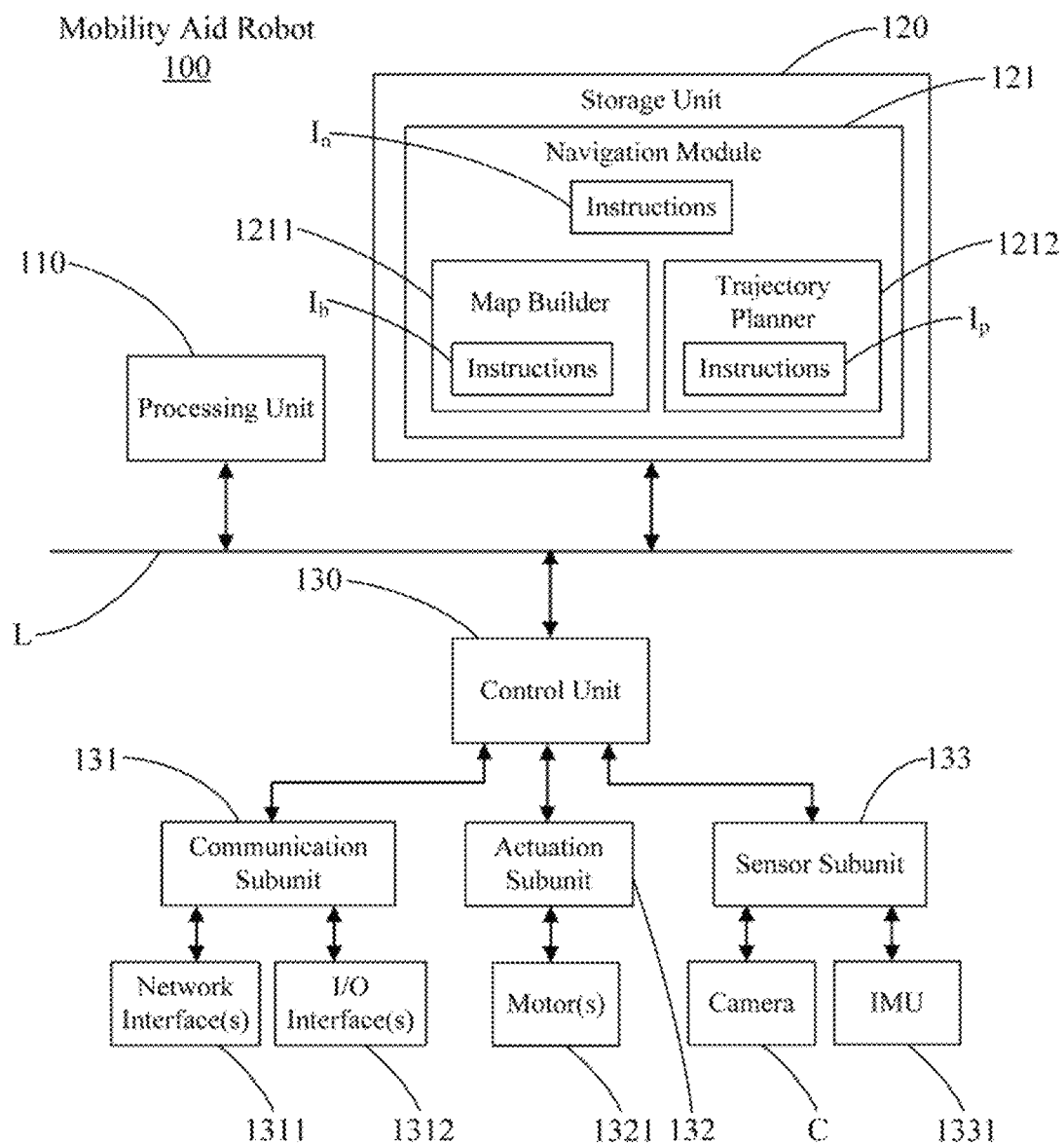
FIG. 2B is a schematic block diagram illustrating the mobility aid robot of FIG. 2A.

FIG. 2B is a schematic block diagram illustrating the mobility aid robot 100 of FIG. 2A. The mobility aid robot 100 may include a processing unit 110, a storage unit 120, and a control unit 130 that communicate over one or more communication buses or signal lines L. It should be noted that, the mobility aid robot 100 is only one example of mobility aid robot, and the mobility aid robot 100 may have more or fewer components (e.g., unit, subunits, and modules) than shown in above or below, may combine two or more components, or may have a different configuration or arrangement of the components. The processing unit 110 executes various (sets of) instructions stored in the storage unit 120 that may be in form of software programs to perform various functions for the mobility aid robot 100 and to process related data, which may include one or more processors (e.g., CPU). The storage unit 120 may include one or more memories (e.g., high-speed random access memory (RAM) and non-transitory memory), one or more memory controllers, and one or more non-transitory computer readable storage media (e.g., solid-state drive (SSD) or hard disk drive). The control unit 130 may include various controllers (e.g., camera controller, display controller, and physical button controller) and peripherals interface for coupling the input and output peripheral of the mobility aid robot 100, for example, external port (e.g., USB), wireless communication circuit (e.g., RF communication circuit), audio circuit (e.g., speaker circuit), sensor (e.g., inertial measurement unit (IMU)), and the like, to the processing unit 110 and the storage unit 120. In some embodiments, the storage unit 120 may include a navigation module 121 for implementing navigation functions (e.g., map building and trajectory planning) related to the navigation (and trajectory planning) of the mobility aid robot 100, which may be stored in the one or more memories (and the one or more non-transitory computer readable storage media).

The navigation module 121 in the storage unit 120 of the mobility aid robot 100 may be a software module (of the operation system of the mobility aid robot 100), which has instructions $I_n$ (e.g., instructions for actuating motor(s) 1321 of the mobility aid robot 100 to move the mobility aid robot 100) for implementing the navigation of the mobility aid robot 100, a map builder 1211, and trajectory planner(s) 1212. The map builder 1211 may be a software module having instructions $I_b$ for building map for the mobility aid robot 100. The trajectory planner(s) 1212 may be software module(s) having instructions $I_p$ for planning trajectories for the mobility aid robot 100. The trajectory planner(s) 1212 may include a global trajectory planner for planning global trajectories (e.g., trajectory $T_1$ and trajectory $T_2$) for the mobility aid robot 100 and a local trajectory planner for planning local trajectories (e.g., a part of the trajectory $T_2$ that includes poses $S_2$-$S_6$ in FIG. 1A) for the mobility aid robot 100. The global trajectory planner may be, for example, a trajectory planner based on Dijkstra's algorithm, which plans global trajectories based on map(s) built by the map builder 1211 through, for example, simultaneous localization and mapping (SLAM). The local trajectory planner may be, for example, a trajectory planner based on TEB (timed elastic band) algorithm, which plans local trajectories based on the global trajectory $P_g$, and other data collected by the mobility aid robot 100. For example, images may be collected through the camera C of the mobility aid robot 100, and the collected images may be analyzed so as to identify obstacles (e.g., the obstacle O in FIG. 4B), so that the local trajectory can be planned with reference to the identified obstacles, and the obstacles can be avoided by moving the mobility aid robot 100 according to the planned local trajectory.

Each of the map builder 1211 and the trajectory planner(s) 1212 may be a submodule separated from the instructions $I_n$ or other submodules of the navigation module 121, or a part of the instructions $I_n$ for implementing the navigation of the mobility aid robot 100. The trajectory planner(s) 1212 may further have data (e.g., input/output data and temporary data) related to the trajectory planning of the mobility aid robot 100 which may be stored in the one or more memories and accessed by the processing unit 110. In some embodiments, each of the trajectory planner(s) 1212 may be a module in the storage unit 120 that is separated from the navigation module 121.

In some embodiments, the instructions $I_n$ may include instructions for implementing collision avoidance of the mobility aid robot 100 (e.g., obstacle detection and trajectory replanning). In addition, the global trajectory planner may replan the global trajectory(s) (i.e., plan new global trajectory(s)) to detour in response to, for example, the original global trajectory(s) being blocked (e.g., blocked by an unexpected obstacle) or inadequate for collision avoidance (e.g., impossible to avoid a detected obstacle when adopted). In other embodiments, the navigation module 121 may be a navigation unit communicating with the processing unit 110, the storage unit 120, and the control unit 130 over the one or more communication buses or signal lines L, and may further include one or more memories (e.g., high-speed random access memory (RAM) and non-transitory memory) for storing the instructions $I_n$, the map builder 1211, and the trajectory planner(s) 1212, and one or more processors (e.g., MPU and MCU) for executing the stored instructions $I_n$, $I_b$ and $I_p$ to implement the navigation of the mobility aid robot 100.

The mobility aid robot 100 may further include a communication subunit 131 and an actuation subunit 132. The communication subunit 131 and the actuation subunit 132 communicate with the control unit 130 over one or more communication buses or signal lines that may be the same or at least partially different from the above-mentioned one or more communication buses or signal lines L. The communication subunit 131 is coupled to communication interfaces of the mobility aid robot 100, for example, network interface(s) 1311 for the mobility aid robot 100 to communicate with the control device 200 via the network, I/O interface(s) 1312 (e.g., a physical button), and the like. The actuation subunit 132 is coupled to component(s)/device(s) for implementing the motions of the mobility aid robot 100 by, for example, actuating motor(s) 1321 of the wheels E and/or joints of the mobility aid robot 100. The communication subunit 131 may include controllers for the above-mentioned communication interfaces of the mobility aid robot 100, and the actuation subunit 132 may include controller(s) for the above-mentioned component(s)/device(s) for implementing the motions of the mobility aid robot 100. In other embodiments, the communication subunit 131 and/or actuation subunit 132 may just abstract component for representing the logical relationships between the components of the mobility aid robot 100.

The mobility aid robot 100 may further include a sensor subunit 133 which may include a set of sensor(s) and related controller(s), for example, the camera C and an IMU 1331 (or an accelerometer and a gyroscope), for detecting the environment in which it is located to realize its navigation. The sensor subunit 133 communicates with the control unit 130 over one or more communication buses or signal lines that may be the same or at least partially different from the above-mentioned one or more communication buses or signal lines L. In other embodiments, in the case that the navigation module 121 is the above-mentioned navigation unit, the sensor subunit 133 may communicate with the navigation unit over one or more communication buses or signal lines that may be the same or at least partially different from the above-mentioned one or more communication buses or signal lines L. In addition, the sensor subunit 133 may just abstract component for representing the logical relationships between the components of the mobility aid robot 100.

In some embodiments, the map builder 1211, the trajectory planner(s) 1212, the sensor subunit 133, and the motor(s) 1321 (and the wheels E and/or joints of the mobility aid robot 100 coupled to the motor(s) 1321) jointly compose a (navigation) system which implements map building, (global and local) trajectory planning, and motor actuating so as to realize the navigation of the mobility aid robot 100. In addition, the various components shown in FIG. 2B may be implemented in hardware, software or a combination of both hardware and software. Two or more of the processing unit 110, the storage unit 120, the control unit 130, the navigation module 121, and other units/subunits/modules may be implemented on a single chip or a circuit. In other embodiments, at least a part of them may be implemented on separate chips or circuits.

Figure 3:
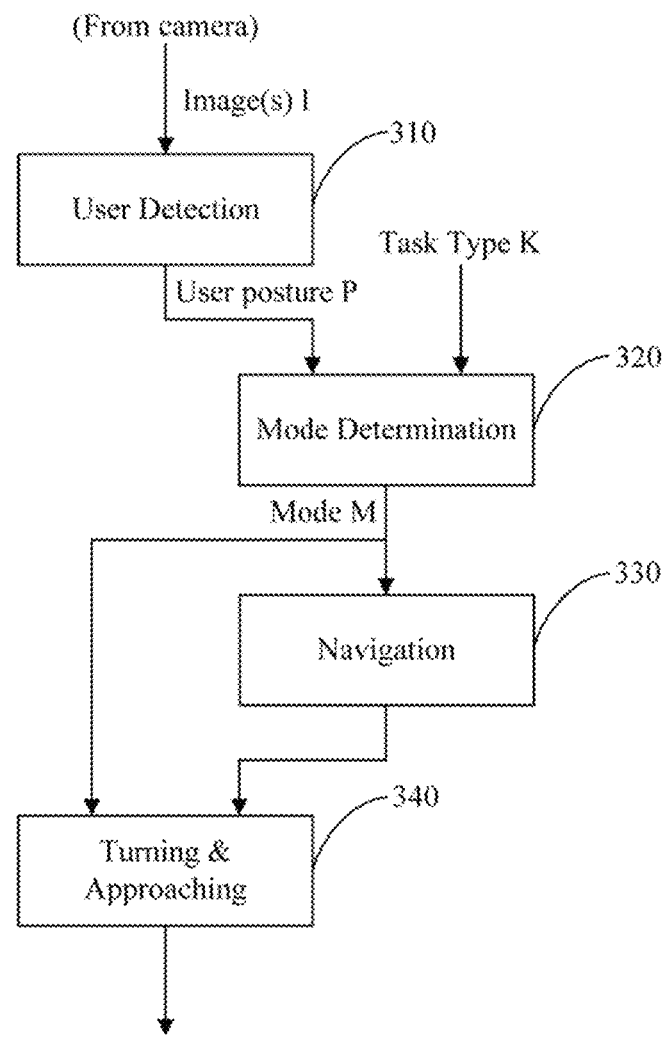
FIG. 3 is a schematic block diagram of an example of navigating the mobility aid robot of FIG. 2A.

FIG. 3 is a schematic block diagram of an example of navigating the mobility aid robot 100 of FIG. 2A. In some embodiments, a navigation method for the mobility aid robot 100 is implemented in the mobility aid robot 100 to navigate the mobility aid robot 100 to the user U so as to perform a specified task (e.g., walking aid) on the user U by, for example, storing (sets of) the instructions $I_n$ corresponding to the navigation method as the navigation module 121 in the storage unit 120 and executing the stored instructions $I_n$ through the processing unit 110, and then the mobility aid robot 100 may be navigated to the user U. The navigation method may be performed in response to, for example, a request for the assistance of the mobility aid robot 100 from, for example, (the navigation/operation system of) the mobility aid robot 100 itself or the control device 200, and may simultaneously considering the obstacles (e.g., the obstacle O in FIG. 4B) detected through the camera C of the mobility aid robot 100, then it may also be re-performed in response to, for example, having detected unexpected obstacles. In other embodiments, the navigation method may also be performed in response to having detected the user U through the camera C of the mobility aid robot 100.

According to the navigation method, the processing unit 110 may identify a posture P of the user U through the camera C of the mobility aid robot 100 (block 310 of FIG. 3). The posture P may include standing, sitting and lying (down). The camera C may be an RGB-D camera which provides a continuous stream of images I (which include color images and depth images). In some embodiments, the user U may be identified first by, for example, using a face matching method (or algorithm) based on a convolutional neural network such as MobileFaceNets to recognize the face of the user U in the image(s) I by searching and matching the features of faces within a dataset stored in the storage unit 120. Then, key points $P_k$ on the body of the identity user U are identified and 31) (three-dimensional) positions of the key points $P_k$ on an estimated skeleton B of the user U are provided base on, for example, a (well-trained) neural network. Finally, the posture P may be identified by, for example, using a classifier to distinguish the posture P of the user U by analyzing the relationships of the positions of the key points $P_k$ on the estimated skeleton B. Simultaneously, the facing direction $D_f$ that the user U is facing may also be identified based on the identified key points $P_k$. The user detection may be re-performed, for example, in every predetermined time interval (e.g., 1 second), until the navigation according to a planned trajectory (block 330 of FIG. 3 and block 530 of FIG. 5) is finished.

Figure 4A:
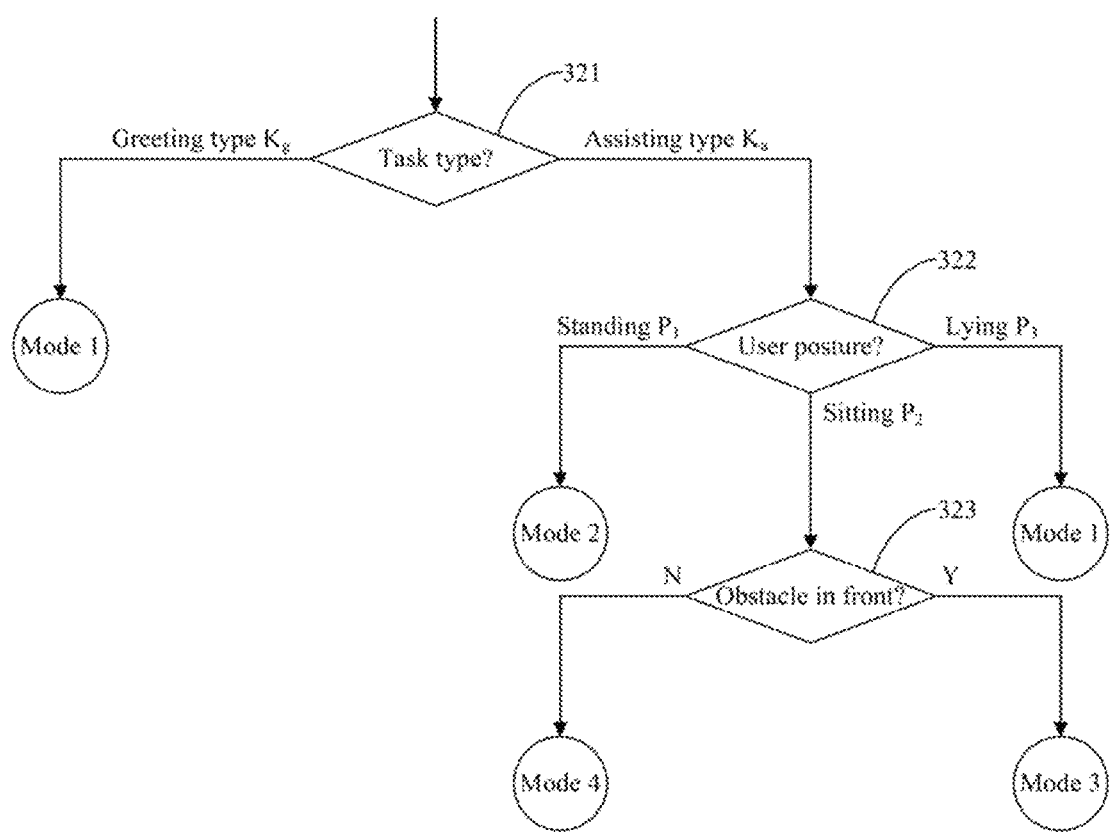
FIG. 4A is a flow chart of an example of mode determination in the example of navigation of FIG. 3.

In the navigation method, the processing unit 110 may further determine a mode M of the mobility aid robot 100 according to a task type K of the specified task to be performed on the user U and the identified posture P of the user U (block 320 of FIG. 3). The specified tasks to be performed on the user U may be divided into a plurality of task types K. The mode M may be the method (or manner, strategy) of the mobility aid robot 100 to approach the user U (e.g., moved to a position in front of or beside the user U), which is determined according to the task type K (e.g., assisting type) of the specified task (e.g., walking aid) to be performed on the user U and the identified posture P of the user U so that the mobility aid robot 100 in the mode M can approach the user U in the method suitable for the task type K and the identified posture P. In other embodiments, the mode M may be other method of the operation of the mobility aid robot 100 (e.g., the method of the mobility aid robot 100 to serve the user U) within the navigation/operation system of the mobility aid robot 100. FIG. 4A is a flow chart of an example of mode determination (block 320 of FIG. 3) in the example of navigation of FIG. 3. In some embodiments, in a mode determination, firstly, the task type K of the specified task to be performed on the user U may be determined (step 321). The task types K of the specified tasks may include an assisting type $K_a$ and a greeting type $K_g$. User assisting tasks such as waking aid and walk training may belong to the assisting type $K_a$, and user interaction tasks such as greeting, talking, and emotion detection may belong to the greeting type $K_g$. The modes M of the mobility aid robot 100 may include:

mode 1: move to the user U and face toward the user U;
mode 2: move to the user U and make a turn;
mode 3: move to the user U, make a turn, and move close to the user; and
mode 4: move to a position in the facing direction $D_f$ of the user U, make a turn, and move close to the user.

In the case that the task type K of the specified task is determined as the greeting type $K_g$, the mode M of the mobility aid robot 100 is determined as mode 1. In the case that the task type K of the specified task is determined as the assisting type $K_a$, step 322 will be performed. The determined mode M may be represented through, for example, a variable (e.g., a constant) stored in the storage unit 120 of the mobility aid robot 100 that is set upon determining the mode M. Alternatively, the mode M may be just an abstract idea which is not represented in the navigation/operation system of the mobility aid robot 100 and is just a method chosen through the steps in the above-mentioned mode determination that makes the mobility aid robot 100 to approach the user U (e.g., if step 321 determines that the task type K of the specified task is assisting type $K_a$, step 322 determines that the posture P of the user U is sitting $P_2$, and step 323 determines that there is no obstacle in the facing direction $D_f$ of the user U, the mobility aid robot 100 will be moved to a position in the facing direction $D_f$ of the user U, turned, and moved close to the user U, as in mode 4 did). In mode 1, the mobility aid robot 100 will be moved to the user U and face toward the user U so as to perform the user interaction tasks of the greeting type $K_g$, for example, greeting, talking, or emotion detection on the user U.

In the mode determination, secondly, the posture P of the user U may be identified (step 322). As mentioned above, the posture P of the user U may include standing $P_1$, sitting $P_2$, and lying $P_3$. In the case that the posture P of the user U is determined as lying $P_3$, the mode M is determined as mode 1. In the case that the posture P of the user U is determined as standing $P_1$, the mode M is determined as mode 2. In mode 2, the mobility aid robot 100 will be moved to the user U and a turn will be made such that the gripping parts G face the user U so as to be gripped by the standing user U. In the case that the posture P of the user U is determined as sitting $P_2$, step 323 will be performed. In the mode determination, finally, whether there is an obstacle in front of the user U may be detected (step 323). In the case that there is an obstacle in the facing direction $D_f$ (i.e., in front) of the user U, the mode M is determined as mode 3; otherwise, the mode M is determined as mode 4. In mode 3, the mobility aid robot 100 will be moved to the user U and a turn will be made such that the gripping parts G face the user U, and then will be moved toward the backward direction $D_b$ for a distance to close to the user U so as to be gripped by the sitting user U. In mode 4, the mobility aid robot 100 will be moved to a position in the facing direction $D_f$ of the user U and a turn is made such that the gripping parts G face the user U, and then moved toward the backward direction $D_b$ for a distance to close to the user U so as to be gripped by the sitting user U. The mode determination may be re-performed in response to, for example, the change of the task type K, the change of the posture P of the user U, and the appearance of obstacles.

Figure 4B:
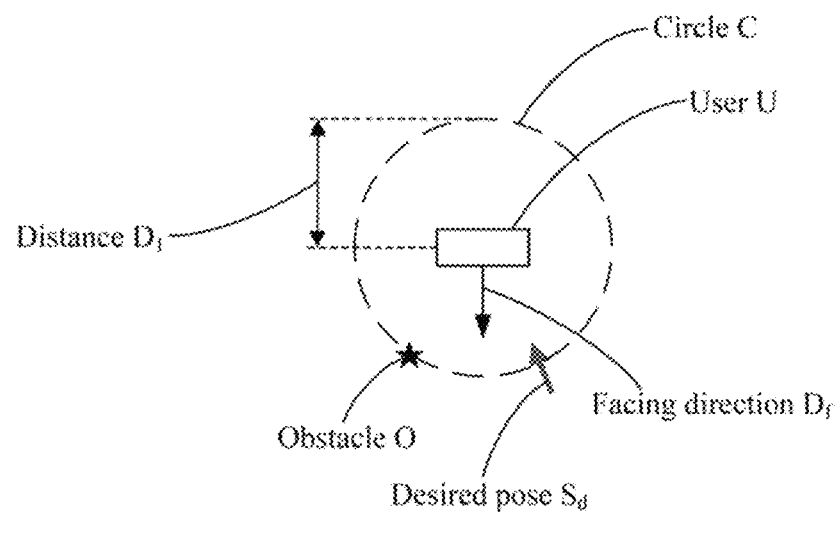
FIG. 4B is a schematic diagram illustrating different positions of desired poses.
Figure 4B:
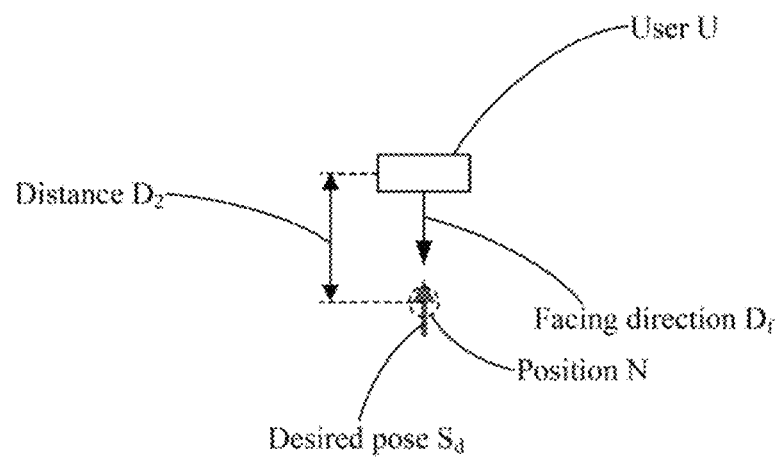

FIG. 4B is a schematic diagram illustrating different positions of the desired pose $S_d$. As shown in the upper part of FIG. 4B, in modes 1, 2 and 3, the mobility aid robot 100 may be moved to the user U such that the desired pose $S_d$ (i.e., the last of a sequence of poses in a trajectory) (e.g., the first desired pose $S_{d1}$) is positioned with a distance $D_1$ to the user U, for example, positioned on a circle C centered at the user U that has a radius of the distance $D_1$ (e.g., 0.4 m) while the obstacle O is avoided. As shown in the lower part of FIG. 4B, in mode 4, the mobility aid robot 100 may be moved to the user U such that the desired pose $S_d$ (e.g., the second desired pose $S_{d2}$) is positioned with a distance $D_2$ to the user U, for example, positioned on a position N in the facing direction $D_f$ of the user U that has the distance $D_2$ (e.g., 0.4 m). Each of the distance $D_1$ and the distance $D_2$ may be a predetermined distance which determined according to actual needs such as personal preferences.

Figure 5:
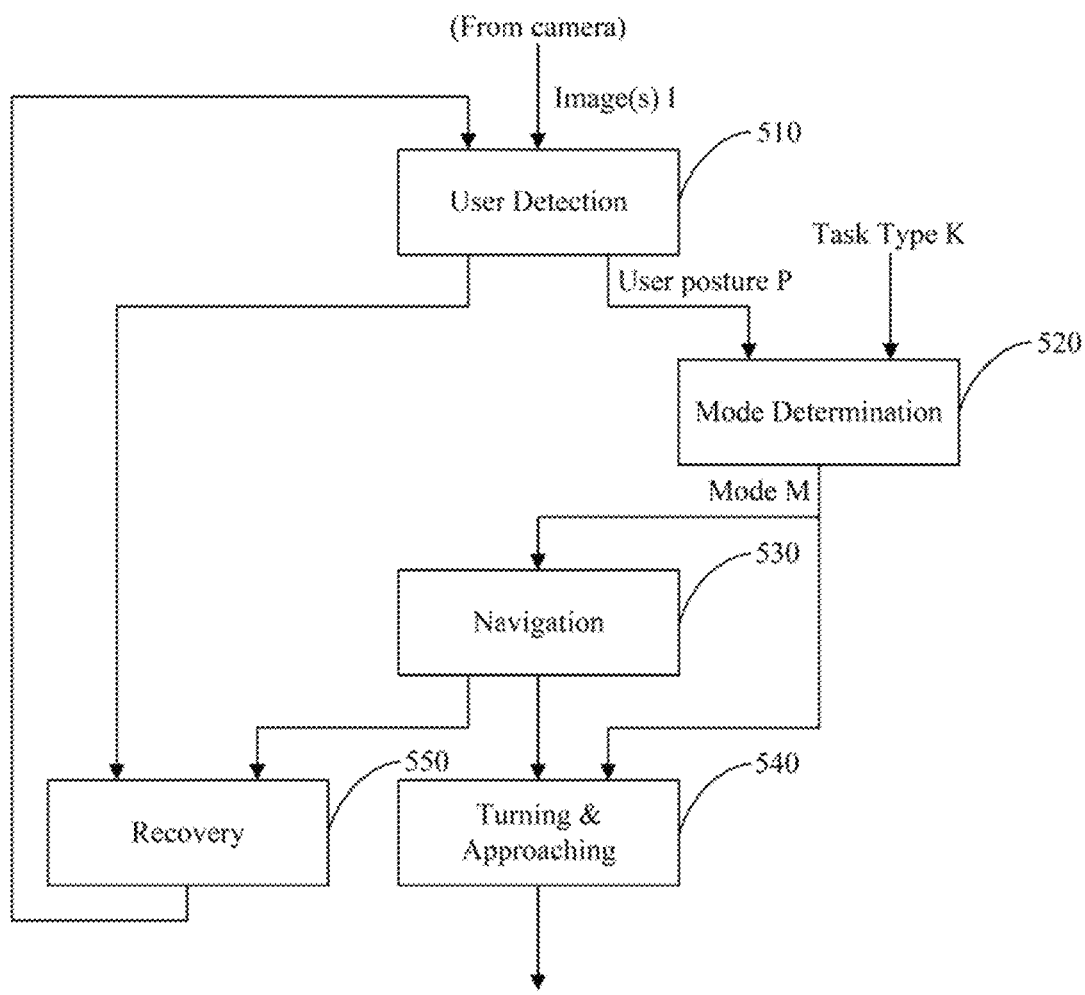
FIG. 5 is a schematic block diagram of another example of mobility aid robot navigation for the mobility aid robot of FIG. 2A.
Figure 6A:
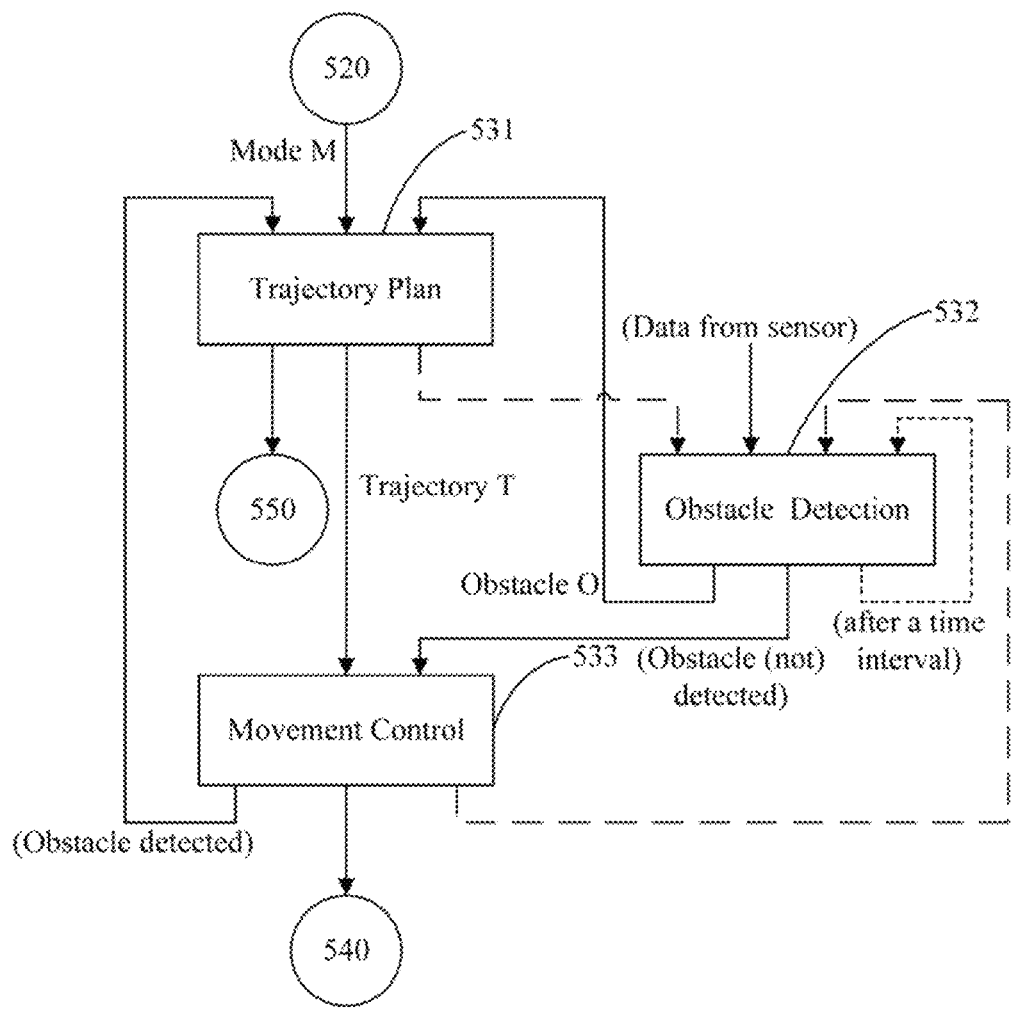
FIG. 6A is a schematic block diagram of an example of navigation according to planned trajectories in the example of mobility aid robot navigation of FIG. 5.

In the navigation method, the processing unit 110 may further control the mobility aid robot 100 to move according to a planned trajectory T (see FIG. 6A) corresponding to the determined mode M of the mobility aid robot 100 (block 330 of FIG. 3). The trajectory T includes a sequence of poses (e.g., poses $S_0$-$S_6$ of trajectory $T_2$), and the last of the sequence of poses is a desired pose $S_d$ (e.g., the second desired pose $S_{d2}$ of trajectory $T_2$). Each of the poses includes a position (e.g., a coordinate in a coordinate system) and a posture (e.g., an Euler angle in the coordinate system) for the mobility aid robot 100. FIG. 5 is a schematic block diagram of another example of mobility aid robot navigation for the mobility aid robot 100 of FIG. 2A. In some embodiments, a recovery (block 550 of FIG. 5) may be performed in the case that the navigation according to the planned trajectory T (block 330 of FIG. 3 and block 530 of FIG. 5) is failed. FIG. 6A is a schematic block diagram of an example of navigation according to planned trajectories in the example of mobility aid robot navigation of FIG. 5. In some embodiments, for realizing the navigation according to the planned trajectory T (block 530 of FIG. 5), the processing unit 110 may plan a trajectory T according to the determined mode M and the detected obstacle O (block 531 of FIG. 6A). The trajectory T may be planned by the above-mentioned global trajectory planner based on map(s) built by the map builder 1211. The trajectory T may be re-planned, for example, upon detecting the obstacle O (see block 532 of FIG. 6A). In addition, if the planning of the trajectory T is failed (e.g., when the mobility aid robot 100 is blocked by the obstacle O), the recovery (block 550 of FIG. 5) my then be performed.

Figure 6B:
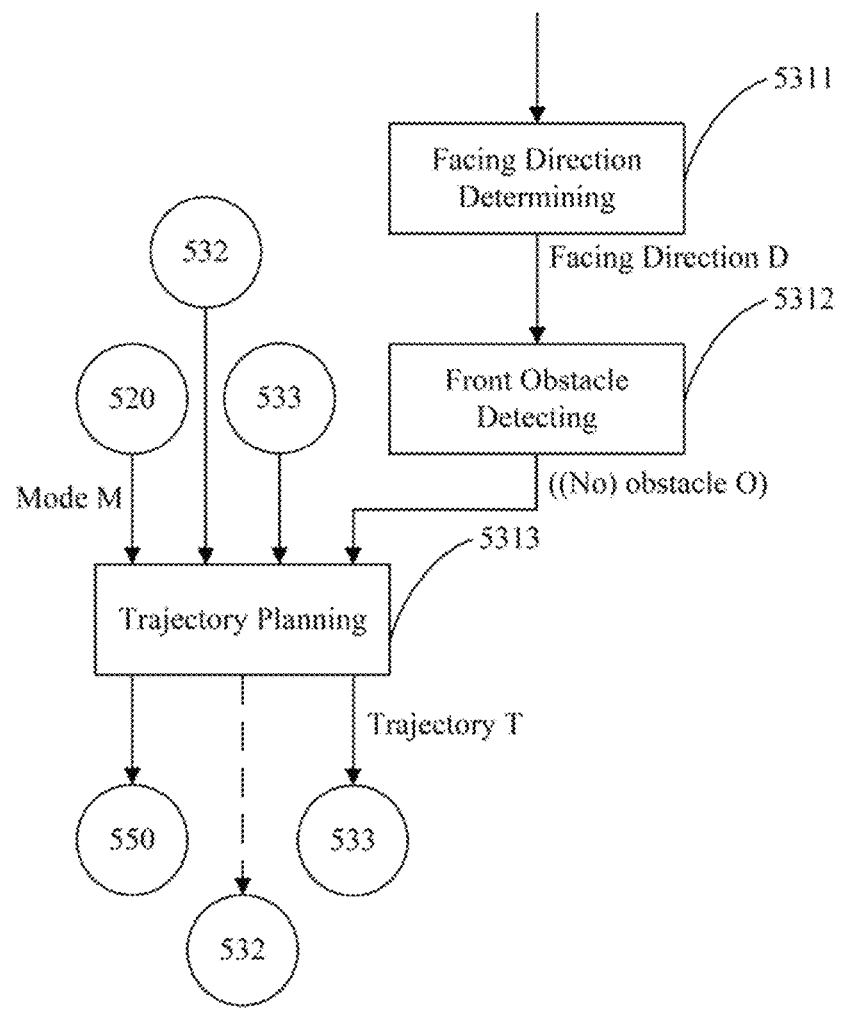
FIG. 6B is a schematic block diagram of an example of trajectory plan in the example of navigation of FIG. 6A.

FIG. 6B is a schematic block diagram of an example of trajectory plan in the example of navigation of FIG. 6A. In some embodiments, for planning the trajectory T (block 531 of FIG. 6A), the processing unit 110 may determine the facing direction $D_f$ of the user U (block 5311 of FIG. 6A). As mentioned above, the facing direction $D_f$ may be determined in the user detection (block 310 of FIG. 3 and block 510 of FIG. 5). The processing unit 110 may further determine whether there is an obstacle O positioned basically in the facing direction $D_f$ of the user U (block 5312 of FIG. 6A). The obstacle O in front of the user U will be detected so as to be avoided. The processing unit 110 may further plan the trajectory T such that the desired pose $S_d$ is positioned basically in the facing direction $D_f$ of the user U (see the lower part of FIG. 4B), in the case that the mobility aid robot 100 is in the mode M corresponding to the specified task of assisting type $K_a$, the posture P of sitting $P_2$, and there is no obstacle O positioned basically in the facing direction $D_f$ of the user U (in mode 4); and the processing unit 110 may further plan the trajectory T such that the desired pose $S_d$ is positioned with the distance $D_1$ to the user U (see the upper part of FIG. 4B), in the case that the mobility aid robot 100 is in the mode M corresponding to the specified task of assisting type $K_a$, the posture P of sitting $P_2$, and there is an obstacle O positioned basically in the facing direction $D_f$ of the user U (in mode 3), the mobility aid robot 100 is in the mode M corresponding to the specified task of assisting type $K_a$ and the posture P of lying $P_3$ (in mode 1), or the mobility aid robot 100 is in the mode M corresponding to the specified task of greeting type $K_g$ (in mode 1) (block 5313 of FIG. 6A). In some embodiments, the processing unit 110 plans the trajectory T such that the desired pose $S_d$ is positioned basically in the facing direction $D_f$ (i.e., in front) of the user U, for example, on the position N of the lower part of FIG. 4B in the facing direction $D_f$ of the user U that has the distance $D_2$ (e.g., 0.4 m) when the mobility aid robot 100 is in mode 4 (which has no obstacle O in front). The processing unit 110 plans the trajectory T such that the desired pose $S_d$ is positioned with the $D_1$ to the user U, for example, on the circle C of the upper part of FIG. 4B that is centered at the user U that has a radius of the distance $D_1$ (e.g., 0.4 m) when the mobility aid robot 100 is in mode 3 (which has an obstacle O in front) or mode 1.

For realizing the navigation according to the planned trajectory T (block 530 of FIG. 5), the processing unit 110 may further detect an obstacle O (block 532 of FIG. 6A). The obstacle detection may be performed after, before or simultaneously with the trajectory plan (block 531 of FIG. 6A). The obstacle O may be detected through the sensor subunit 133. In some embodiments, sensor data may be collected through the sensor subunit 133, and the collected data may be analyzed so as to identify the obstacle O that, for example, appears suddenly or suddenly found while approaching. The sensor data may be collected from different sensors (e.g., RGB-D camera, LiDAR, sonar, and IR), and a fusion algorithms such as Kalman filter may be used to fuse the sensor data received from the sensors so as to, for example, reduce uncertainties due to noisy data, to fuse data with different rates, and to combine data for same objects. For example, images may be collected through the camera C in the sensor subunit 133 and other data may be collected through other sensor such as LiDAR, sonar and IR in the sensor subunit 133, then the collected data may be fused to analyze so as to identify the obstacle O. The processing unit 110 may further plan local trajectory(s) (e.g., a part of the trajectory $T_2$ that includes poses $S_2$-$S_6$ in FIG. 1A) based on the planned global trajectory, the sensor data collected through the sensor subunit 133 of the mobility aid robot 100, and the current pose of the mobility aid robot 100, that is, the pose in the trajectory T at which the mobility aid robot 100 is currently at. For example, images may be collected through the camera C, and the collected images may be analyzed so as to identify obstacles (e.g., the obstacle O), so that the local trajectory can be planned with reference to the identified obstacles, and the obstacles can be avoided by moving the mobility aid robot 100 according to the planned local trajectory. In some embodiments, the local trajectory(s) may be planned through the above-mentioned trajectory planner by generating the local trajectory based on the planned global trajectory while taking the identified obstacles into consideration (e.g., avoiding the identified obstacles). In addition, the obstacle detection may be re-performed, for example, in every predetermined time interval (e.g., 1 second) until the navigation according to the planned trajectory T (block 530 of FIG. 5) is finished.

For realizing the navigation according to the planned trajectory T (block 530 of FIG. 5), the processing unit 110 may further control the mobility aid robot 100 to move according to the planned trajectory T (block 533 of FIG. 6A). In some embodiments, the above-mentioned planned local trajectory includes a plurality of poses for the mobility aid robot 100, and the motor(s) 1321 of the mobility aid robot 100 may be actuated according to the poses in the local trajectory so that the mobility aid robot 100 is moved according to the local trajectory, thereby implementing the navigation of the mobility aid robot 100 according to the planned trajectory T. A tracking controller may be triggered to make sure the mobility aid robot 100 to move along the planned trajectory T precisely, and the tracking controller may generate velocities for actuating the motor(s) 1321. In addition, the obstacle detection (block 532 of FIG. 6A) may be re-performed, for example, in every predetermined distance (e.g., 10 cm) of movement or after the movement corresponding to each pose, until the navigation according to the planned trajectory T (block 530 of FIG. 5) is finished. Furthermore, in the movement control (block 533 of FIG. 6A), in the case that the detected obstacle O is a moving obstacle which appearing suddenly or a hard-to-detect obstacle which found suddenly (some obstacles are hard to be detected in long distances due to a lack of perception awareness), the velocity of the mobility aid robot 100 may be reduced and even fully stop in case of there is not time to replanning a trajectory to reroute it, which may be realized by a collision avoidance module which achieves fast response by reducing the velocity of the mobility aid robot 100 without complicated calculation. For example, the raw sensor data collected from one or more sensors (e.g., RGB-D camera, LiDAR, sonar, and IR) in the sensor subunit 133 may be fetched directly and processed in real-time, then the instruction of reducing the velocity of the mobility aid robot 100 may be transmitted by the collision avoidance module to a low-level control loop in the motor(s) 1321, thereby reducing the velocity of the mobility aid robot 100.

Figure 6C:
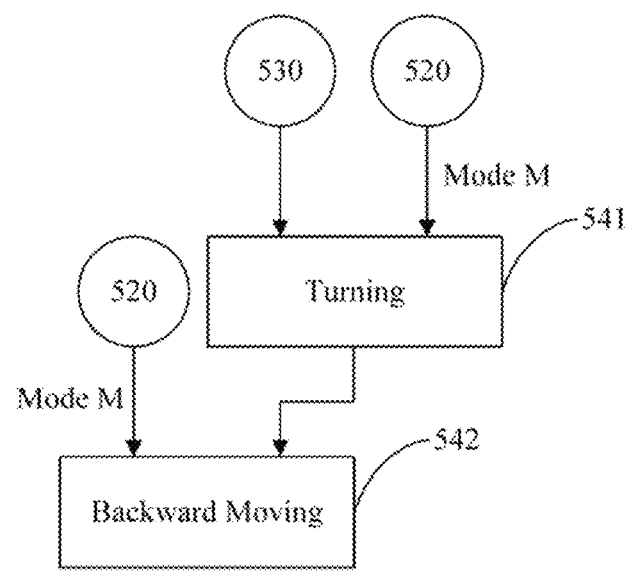
FIG. 6C is a schematic block diagram of an example of turning and approaching in the example of mobility aid robot navigation of FIG. 5.

In the navigation method, the processing unit 110 may further move the mobility aid robot 100 upon reaching the desired pose $S_d$ such that the gripping parts G faces the user U, in the case that the mobility aid robot 100 is in the mode M corresponding to the specified task of assisting type $K_a$ and the posture P of one of standing $P_1$ and sitting $P_2$ (block 540 of FIG. 5). In some embodiments, the processing unit 110 moves (e.g., turns) the mobility aid robot 100 upon reaching the desired pose $S_d$ such that the gripping parts G face the user U when the mobility aid robot 100 is in mode 2, mode 3 or mode 4. FIG. 6C is a schematic block diagram of an example of turning and approaching in the example of mobility aid robot navigation of FIG. 5. In some embodiments, for making the gripping parts G to face the user U (block 540 of FIG. 5), the processing unit 110 may turn the mobility aid robot 100 upon reaching the desired pose $S_d$ such that the gripping parts G faces the user U, in the case that the mobility aid robot 100 is in the mode M corresponding to the specified task of assisting type $K_a$ and the posture P of one of standing $P_1$ and sitting $P_2$ (block 541 of FIG. 5). The mobility aid robot 100 may be turned in situ (i.e., moved around an axis through the mobility aid robot 100) by, for example, turning two front wheels E (i.e., the two wheels E at the forward direction $D_p$) while braking two rear wheels E (i.e., the two wheels E at the backward direction $D_b$). In some embodiments, the processing unit 110 turns the mobility aid robot 100 upon reaching the desired pose $S_d$ such that the gripping parts G face the user U when the mobility aid robot 100 is in mode 2, mode 3 or mode 4, thereby approaching the user U and facilitating the reaching of the gripping parts G for the user U who is standing or sitting. For the mobility aid robot 100, since the camera C is disposed toward the forward direction $D_p$ which the mobility aid robot 100 straightly moves and the gripping parts G is disposed toward the backward direction $D_b$ basically counter to the forward direction $D_p$, the mobility aid robot 100 may be turned for 180 degrees upon reaching the desired pose $S_d$ to make the gripping parts G facing the user U.

For making the gripping parts G to face the user U (block 540 of FIG. 5), the processing unit 110 may further move the mobility aid robot 100 toward the backward direction $D_b$ for a distance $D_3$ (see FIG. 1C) to close to the user U, in the case that the mobility aid robot 100 is in the mode M corresponding to the specified task of assisting type $K_a$ and the posture P of sitting $P_2$ (block 542 of FIG. 5). The distance $D_3$ may be a predetermined distance (e.g., 0.3 m). In some embodiments, the processing unit 110 moves the mobility aid robot 100 toward the backward direction $D_b$ for the distance $D_3$ to close to the user U, when the mobility aid robot 100 is in mode 4, thereby further approaching the user U and facilitating the reaching of the gripping parts G for the sitting user U since the sitting user U cannot reach the gripping parts G as far as the user U who is standing.

In the navigation method, the processing unit 110 may further perform a recovery in response to failing the user detection (block 310 of FIG. 3 and block 510 of FIG. 5) or (the trajectory plan (block 531 of FIG. 6A) in) the navigation according to the planned trajectory T (block 530 of FIG. 5) (block 550 of FIG. 5). For example, the recovery may be performed by triggering a speaker of the mobility aid robot 100 to remind the user U to change his/her location for easier approaching before retry the user detection or the navigation according to the planned trajectory T.

Figure 7:
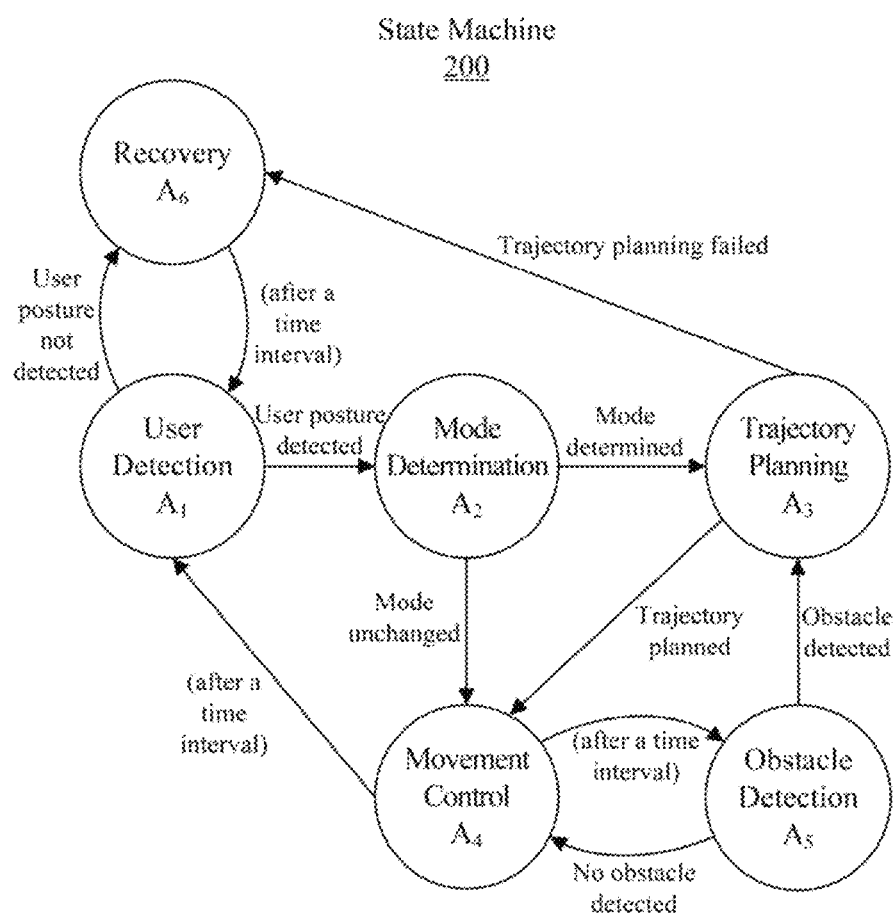
FIG. 7 is a schematic block diagram of an example of a state machine for the mobility aid robot of FIG. 2A.

In order to guarantee the successful navigation of the mobility aid robot 100, a state machine may be used to perform the related operations (e.g., trajectory planning) according to the specified state order in the state machine by, for example, calling the corresponding module (e.g., the trajectory planner(s) 1212). FIG. 7 is a schematic block diagram of an example of a state machine 200 for the mobility aid robot 100 of FIG. 2A. The state machine 200 is an abstract machine that can be in exactly one of a plurality of states for the mobility aid robot 100 at any given time, which is stored in the storage unit 120 of the mobility aid robot 100. In some embodiments, the state machine 200 may have a user detection state $A_1$ at which the user detection (block 310 of FIG. 3 and block 510 of FIG. 5) is performed, a mode determination state $A_2$ at which the mode determination (block 320 of FIG. 3 and block 520 of FIG. 5) is performed, a trajectory planning state $A_3$ at which the trajectory plan (block 531 of FIG. 6A) is performed, a movement control state $A_4$ at which the movement control (block 533 of FIG. 6A) is performed, an obstacle detection state $A_5$ at which the obstacle detection (block 532 of FIG. 6A) is performed, and a recovery state $A_6$ at which the recovery (block 550 of FIG. 5) is performed.

The state machine 200 is changed from one state to another in response to some conditions. It may change from the user detection state $A_1$ to the mode determination state $A_2$ upon detected (the posture P of) the user U, and to the recovery state $A_6$ upon not detected (the posture P of) the user U. It may change from the mode determination state $A_2$ to the trajectory planning state $A_3$ upon determined the newly detected or changed mode M of the mobility aid robot 100, or to the movement control state $A_4$ upon determined the unchanged mode M of the mobility aid robot 100 (i.e., the determined mode M is unchanged since the last determination). It may change from the trajectory planning state $A_3$ to the movement control state $A_4$ upon planned the trajectory T, and to the recovery state $A_6$ upon failed in planning the trajectory T. It may change from the movement control state $A_4$ to the obstacle detection state $A_5$, for example, after a predetermined time interval (e.g., 1 second), and to the user detection state $A_1$, for example, after another predetermined time interval (e.g., 2 seconds). It may change from the obstacle detection state $A_5$ to the trajectory planning state $A_3$ upon detected the obstacle O, or to the movement control state $A_4$ upon not detected the obstacle O. It may change from the recovery state $A_6$ to the user detection state $A_1$, for example, after a still another predetermined time interval (e.g., 10 seconds).

In some embodiments, there may be a plurality of state machines, where each of the state machines is for each mode M, and the corresponding state machines may be used upon determined each mode M (block 320 of FIG. 3 and block 520 of FIG. 5). For example, for mode 1, the corresponding state machine may have the movement control state $A_4$ at which the movement control (block 533 of FIG. 6A) and a movement (e.g., a turning) to face toward the user U are performed. For mode 2, the corresponding state machine may have the movement control state $A_4$ at which the movement control and the turning and approaching (see block 340 of FIG. 3 and block 540 of FIG. 5) with the turning (block 541 of FIG. 6C) are performed. For mode 3, the corresponding state machine may have the movement control state $A_4$ at which the above-mentioned movement control and the above-mentioned turning and approaching with the above-mentioned turning and the backward moving (block 542 of FIG. 6C) are performed. For mode 4, the corresponding state machine may have the trajectory planning state $A_3$ at which the trajectory plan (block 531 of FIG. 6A) with the facing direction determining (block 5311 of FIG. 6B), the above-mentioned movement control, and the above-mentioned turning and approaching with the above-mentioned turning and the above-mentioned backward moving are performed.

The navigation method navigates a mobility aid robot equipped with a forward-facing camera to approach a user in a manner which is suitable for the user's posture, which facilitates the reaching of (gripping parts of) the robot for the user at different posture of the user so as to assist the user to move in a more effective, safety, and smooth way, thereby enhancing the effectiveness, the safeness, and the user experience of the robot. Since the essential camera (e.g., an RGBD camera) is easy to obtain, low-price, small, lightweight, and easy to be integrated into the robot while only a few computation resources are needed to perform the navigation method, the navigation method is easy to be implemented in various platforms and robots. The applications of the navigation method may include approaching the user for walking aid, greeting, talking, consulting, guiding, screening, body temperature monitoring, and the like.

It can be understood by those skilled in the art that, all or part of the method in the above-mentioned embodiment(s) can be implemented by one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned navigation method and mobility aid robot may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A method for navigating a mobility aid robot to a user for performing a specified task on the user, wherein the robot has a camera and at least a gripping part disposed toward different directions, and the method comprises:
   identifying, through the camera, a posture of the user, and wherein the posture of the user comprises: a standing posture, a sitting posture and a lying down posture;
   determining a mode of the robot according to a type of the specified task to be performed on the user and the identified posture of the user, and wherein a type of the specified task comprises: an assisting type and a greeting type;
   controlling the robot to move according to a planned trajectory corresponding to the determined mode of the robot, wherein the trajectory comprises a sequence of poses, and the last of the sequence of poses is a desired pose; and
   turning the robot upon reaching the desired pose such that the gripping part faces the user, in response to the determined mode of the robot corresponding to the specified task of the assisting type and the user at one of the standing posture and the sitting posture;
   wherein in response to the specified task to be performed on the user being the assisting type, and the user being at the sitting posture, the method further comprises:
      determining a facing direction of the user; and
      determining whether there is an obstacle positioned in the facing direction of the user, and obtaining a determining result, wherein the mode of the robot is determined according to the type of the specified task to be performed on the user, the identified posture of the user, and the determining result;
   wherein after the determining whether there is the obstacle positioned in the facing direction of the user, the method further comprises:
      planning the trajectory such that the desired pose is positioned with a first distance to the user, in response to the determined mode of the robot corresponding to the specified task of the assisting type, the user at the sitting posture, and there being the obstacle positioned in the facing direction of the user; and
      planning the trajectory such that the desired pose is positioned in the facing direction of the user, in response to the determined mode of the robot corresponding to the specified task of the assisting type, the user at the sitting posture, and there being no obstacle positioned in the facing direction of the user.

2. The method of claim 1, wherein the camera is disposed toward a forward direction of the robot, and the gripping part is disposed toward a backward direction counter to the forward direction, and the turning the robot upon reaching the desired pose such that the gripping part faces the user comprises:
   turning the robot for 180 degrees upon reaching the desired pose such that the gripping part faces the user.

3. The method of claim 2, wherein after the turning the robot for 180 degrees upon reaching the desired pose such that the gripping part faces the user, the method further comprises:
   moving the robot toward the backward direction for a second distance to close to the user after turning the robot, in response to the determined mode of the robot being corresponding to the specified task of the assisting type and the user at the sitting posture.

4. The method of claim 1, wherein the trajectory is planned further by:
   planning the trajectory such that the desired pose is positioned with a third distance to the user, in response to the determined mode of the robot corresponding to the specified task of the assisting type and the user at a lying posture, or the determined mode of the robot corresponding to the specified task of a greeting type.

5. The method of claim 1, wherein the identifying, through the camera, the posture of the user comprises:
   identifying the user by recognizing a face of the user in a image obtained through the camera by using a face matching algorithm based on a convolutional neural network;
   identifying key points on a body of the user to provide three-dimensional positions of the key points on an estimated skeleton of the user; and
   identifying the posture of the user by analyzing the three-dimensional positions of the key points on the estimated skeleton of the user; and
   wherein the facing direction of the user is determined based on the key points.

6. The method of claim 1, wherein the mode of the robot comprise a first mode, a second mode, a third mode, a fourth mode and a fifth mode;
   the mode of the robot is determined as the first mode, in response to the type of the specified task to be performed on the user being determined as the greeting type;
   the mode of the robot is determined as the fifth mode, in response to the type of the specified task to be performed on the user being determined as the assisting type, and the user being at the lying down posture;
   the mode of the robot is determined as the second mode, in response to the type of the specified task to be performed on the user being determined as the assisting type, and the user being at the standing posture;
   the mode of the robot is determined as the third mode, in response to the type of the specified task to be performed on the user being determined as the assisting type, the user being at the sitting posture, and there being the obstacle positioned in the facing direction of the user; and
   the mode of the robot is determined as the fourth mode, in response to the type of the specified task to be performed on the user being determined as the assisting type, the user being at the sitting posture, and there not being the obstacle positioned in the facing direction of the user;
   wherein in response to the mode of the robot is determined as the first mode or the fifth mode, the robot is moved to the user and faced toward the user;
      in response to the mode of the robot is determined as the second mode, the robot is moved to the user and made a turn;
      in response to the mode of the robot is determined as the third mode, the robot is moved to the user, made the turn, and moved close to the user; and
      in response to the mode of the robot is determined as the fourth mode, the robot is moved to a position in the facing direction of the user, made the turn, and moved close to the user.

7. The method of claim 6, wherein the first mode, the second mode, the third mode and the fourth mode correspond to a first state machine, a second state machine, a third state machine and a fourth state machine respectively, and a corresponding state machine is used when the mode of the robot is determined; and wherein the first state machine has a first movement control state at which a movement control and a movement to face toward the user are performed;

the second state machine has a second movement control state at which the movement control, and a turning and approaching with the turning are performed;

the third state machine has a third movement control state at which the movement control, the turning and approaching with the turning, and a backward moving are performed; and the fourth state machine has a trajectory planning state at which a trajectory plan with a facing direction determining, the movement control, the turning and approaching with the turning, and the backward moving are performed.

8. The method of claim 1, wherein the robot further has a walking frame, two front wheels and two rear wheels, the gripping part is attached to an upper edge of the walking frame, and the two front wheels and two rear wheels are attached to a bottom of the walking frame.

9. The method of claim 1, wherein the method further comprises:

performing an obstacle detection after a movement corresponding to each of the sequence of poses; and when the detected obstacle is a moving obstacle, controlling robot to reduce a velocity of the robot.

10. A mobility aid robot, comprising:

a camera disposed toward a forward direction of the robot;

at least a gripping part disposed toward different directions with the camera;

one or more processors; and one or more memories storing one or more programs configured to be executed by the one or more processors, wherein the one or more programs comprise instructions to:

identify, through the camera, a posture of the user, and wherein the posture of the user comprises: a standing posture, a sitting posture and a lying down posture;

determine a mode of the robot according to a type of the specified task to be performed on the user and the identified posture of the user, and wherein a type of the specified task comprises: an assisting type and a greeting type;

control the robot to move according to a planned trajectory corresponding to the determined mode of the robot, wherein the trajectory comprises a sequence of poses, and the last of the sequence of poses is a desired pose; and turn the robot upon reaching the desired pose such that the gripping part faces the user, in response to the determined mode of the robot corresponding to the specified task of the assisting type and the user at one of the standing posture and the sitting posture;

wherein the one or more programs further comprise instructions to:

in response to the specified task to be performed on the user being the assisting type, and the user being at the sitting posture, determine a facing direction of the user; and determine whether there is an obstacle positioned in the facing direction of the user, and obtain a determining result, wherein the mode of the robot is determined according to the type of the specified task to be performed on the user, the identified posture of the user, and the determining result;

wherein the one or more programs further comprise instructions to:

plan the trajectory such that the desired pose is positioned with a first distance to the user, in response to the determined mode of the robot corresponding to the specified task of the assisting type, the user at the sitting posture, and there being the obstacle positioned in the facing direction of the user; and plan the trajectory such that the desired pose is positioned in the facing direction of the user, in response to the determined mode of the robot corresponding to the specified task of the assisting type, the user at the sitting posture, and there being no obstacle positioned in the facing direction of the user.

11. The robot of claim 10, wherein the gripping part is disposed toward a backward direction counter to the forward direction, and the turning the robot upon reaching the desired pose such that the gripping part faces the user comprises:

turning the robot for 180 degrees upon reaching the desired pose such that the gripping part faces the user.

12. The robot of claim 11, wherein the one or more programs further comprise instructions to:

move the robot toward the backward direction for a second distance to close to the user after turning the robot, in response to the determined mode of the robot being corresponding to the specified task of the assisting type and the user at the sitting posture.

13. The robot of claim 10, wherein the one or more programs further comprise instructions to:

plan the trajectory such that the desired pose is positioned with a third distance to the user, in response to the determined mode of the robot corresponding to the specified task of the assisting type and the user at a lying posture, or the determined mode of the robot corresponding to the specified task of a greeting type.

14. The robot of claim 10, wherein the identifying, through the camera, the posture of the user comprises:

identifying key points on a body of the user to provide three-dimensional positions of the key points on an estimated skeleton of the user; and identifying the posture of the user by analyzing the three-dimensional positions of the key points on the estimated skeleton of the user.

15. A non-transitory computer readable storage medium storing one or more programs, wherein the one or more programs comprise instructions, which when executed by a mobility aid robot having a camera and at least a gripping part disposed toward different directions, cause the robot to:

identify, through the camera, a posture of the user, and wherein the posture of the user comprises: a standing posture, a sitting posture and a lying down posture;

determine a mode of the robot according to a type of the specified task to be performed on the user and the identified posture of the user, and wherein a type of the specified task comprises: an assisting type and a greeting type;

control the robot to move according to a planned trajectory corresponding to the determined mode of the robot, wherein the trajectory comprises a sequence of poses, and the last of the sequence of poses is a desired pose; and turn the robot upon reaching the desired pose such that the gripping part faces the user, in response to the determined mode of the robot corresponding to the specified task of the assisting type and the user at one of the standing posture and the sitting posture;

wherein the one or more programs further comprise instructions causing the robot to:
  in response to the specified task to be performed on the user being the assisting type, and the user being at the sitting posture, determine a facing direction of the user; and
  determine whether there is an obstacle positioned in the facing direction of the user, and obtain a determining result, wherein the mode of the robot is determined according to the type of the specified task to be performed on the user, the identified posture of the user, and the determining result;

wherein the one or more programs further comprise instructions causing the robot to:
  plan the trajectory such that the desired pose is positioned with a first distance to the user, in response to the determined mode of the robot corresponding to the specified task of the assisting type, the user at the sitting posture, and there being the obstacle positioned in the facing direction of the user; or
  plan the trajectory such that the desired pose is positioned in the facing direction of the user, in response to the determined mode of the robot corresponding to the specified task of the assisting type, the user at the sitting posture, and there being no obstacle positioned in the facing direction of the user.

16. The storage medium of claim 15, wherein the camera is disposed toward a forward direction of the robot, and the gripping part is disposed toward a backward direction counter to the forward direction, and the turning the robot upon reaching the desired pose such that the gripping part faces the user comprises:
  turning the robot for 180 degrees upon reaching the desired pose such that the gripping part faces the user.

17. The storage medium of claim 16, wherein the one or more programs further comprise instructions causing the robot to:
  move the robot toward the backward direction for a second distance to close to the user after turning the robot, in response to the determined mode of the robot being corresponding to the specified task of the assisting type and the user at the sitting posture.

18. The storage medium of claim 15, wherein the one or more programs further comprise instructions causing the robot to:
  plan the trajectory such that the desired pose is positioned with a third distance to the user, in response to the determined mode of the robot corresponding to the specified task of the assisting type and the user at a lying posture, or the determined mode of the robot corresponding to the specified task of a greeting type.

* * * * *